United States Patent Office 2,864,772
Patented Dec. 16, 1958

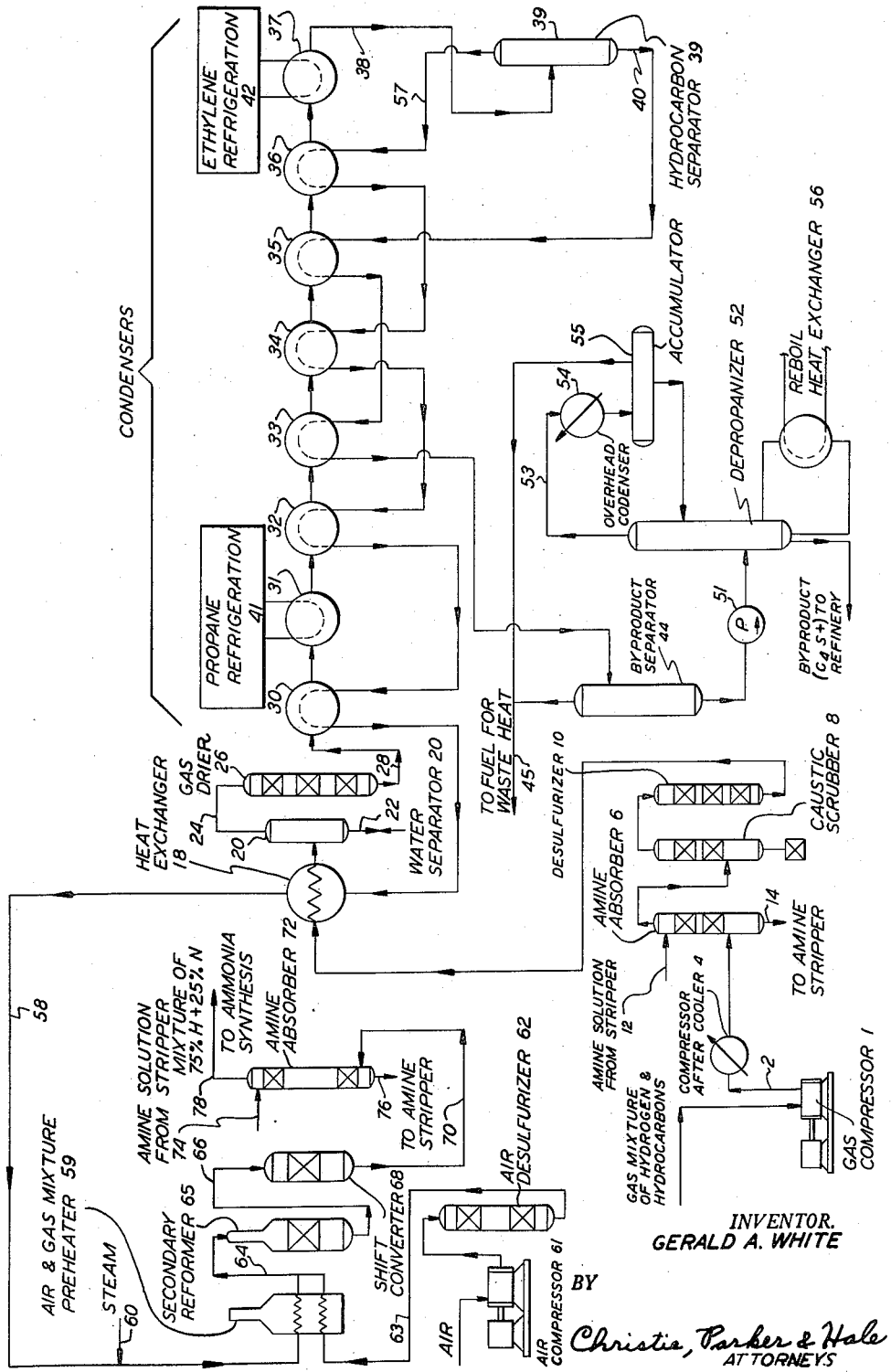

2,864,772

GAS PROCESSING

Gerald A. White, Los Angeles, Calif., assignor to C. F. Braun & Co., Alhambra, Calif., a corporation of California Application January 16, 1956, Serial No. 559,298

4 Claims. (Cl. 252—376)

This invention relates to processes for removing hydrocarbons from a gas mixture of hydrogen and hydrocarbons by chemical conversion and by physical separation to produce hydrogen-rich gases for any desired purpose. The invention is particularly suitable for preparing a feed gas for ammonia synthesis.

In recent years the commercial production of ammonia has become increasingly important due to the wider acceptance of fertilizing programs to increase the quality and quantity of agricultural output. Ammonia is produced from the reaction of hydrogen and nitrogen at high pressures and temperatures in the presence of a catalyst, and requires as raw materials relatively pure hydrogen and nitrogen.

A paper entitled "Hydrogen From Catalytic Reformer Off-Gas" by Carl Pfeiffer and Henry J. Sandler presented at the May 11, 1955, meeting of the American Petroleum Institute's Division of Refining in St. Louis, Missouri, discusses various processes for increasing the hydrogen concentration of off-gases coming from catalytic reformers. Catalytic reformer off-gas usually contains between 77% and 95% of hydrogen by volume, the remainder of the gas being principally hydrocarbons having six or less carbon atoms per molecule. Messrs. Pfeiffer and Sandler, in the referred to paper, discuss six processes for treating such reformer off-gas to obtain a feed gas suitable for ammonia synthesis.

Of the six possible processes discussed in the paper, a low temperature separation process is indicated to be the most attractive commercially. In this process the off-gas, which contains a mixture of hydrogen and relatively light hydrocarbons, say mostly methane through hexane, is chilled to an extremely low temperature and washed in a column of liquid nitrogen so that all traces of hydrocarbons are condensed and scrubbed out of the gas. This leaves a practically pure hydrogen gas. As the authors of the paper point out, this process has the disadvantage that it must be designed for a specific feed gas, and large variations in feed composition cannot be tolerated. This process also has the disadvantage of requiring a source of pure nitrogen to combine with the hydrogen for ammonia synthesis. Such a nitrogen supply is available at the present time in commercial quantities only from expensive liquid air plants which fractionate air into nitrogen and oxygen. A further disadvantage pointed out by the authors is that the low temperature separation produces less hydrogen than is originally present in the off-gas.

Another process discussed in the paper is that of steam reforming. This process is well known and may be used on hydrogen-rich gases such as those coming from a catalytic reformer, or on natural gas to produce hydrogen. The process reacts steam with some of the hydrocarbons in an expensive primary reformer to form hydrogen and carbon monoxide. The reactants, which are reduced in hydrocarbons, are further processed in a secondary reformer, which is less expensive than the primary reformer, to complete the reaction of the remaining hydrocarbons with steam to form hydrogen and carbon monoxide. The disadvantage of steam reforming of a gas with a relatively high concentration of hydrocarbons is that the process has a high heat load and the high temperatures encountered require transfer of the heat of reaction through high cost alloy tubes. As the paper points out, steam reforming is not as economical as the low temperature separation method and has the disadvantage that the process cannot make full use of the high pressure level at which most reformer off-gas is available.

Another process discussed in the paper is that of oil scrubbing followed by steam reforming. This process includes absorbing in oil enough of the heavier hydrocarbons from the off-gas to permit reforming with steam in an operation which is essentially the same as in the conventional secondary reformer. As the authors point out, this is the least satisfactory of the six processes evaluated. In using the oil scrubbing process, the hydrocarbon content must be reduced to about 6% by volume, or less, before it can be subjected to secondary reforming. This process also has the disadvantage, as pointed out in the paper, that it cannot utilize the high pressure level at which the off-gas is generally available.

My invention provides a process for removing hydrocarbons from a gas mixture of hydrogen and hydrocarbons which overcomes the various disadvantages of the processes discussed in the article and other conventional processes not specifically considered. This process makes a gas product having more hydrogen than originally present in the gas mixture, and is able to handle gas mixtures which may vary widely in composition, say from about 50% to 98% hydrogen by volume, the remainder of the gas being principally hydrocarbon. A further advantage is that the process is able to utilize to the fullest extent the high pressure level at which catalytic reformer off-gas is normally available. Moreover, the need for a liquid air plant is eliminated, and the gas mixture having as much as 20% by volume of hydrocarbons is readily handled in the secondary reformer. As gas mixture rich in hydrogen and suitable for use as a feed gas to the process of the invention will be hereinafter referred to as "feed gas."

Briefly, the invention includes cooling a feed gas of hydrogen and hydrocarbons to condense at least substantially all of the hydrocarbon molecules having more than three carbon atoms and yet leave in the gas at least substantially all of the methane. Conveniently, most of the $C_3$ and heavier hydrocarbons are removed in this fashion, and most of the $C_2$ and lighter hydrocarbons are retained with the hydrogen. An important feature of this process is this deliberate retention of at least an appreciable part of the low molecular weight hydrocarbons. The condensed hydrocarbons are separated from the remaining gas. Oxygen or an oxygen gas is added to the mixture, now referred to as "reformer feed" and the oxygen is caused to react with at least some of the remaining hydrocarbons to produce carbon monoxide and carbon dioxide. The carbon monoxide is reacted with steam to produce carbon dioxide and additional hydrogen. Any remaining hydrocarbons are also reacted with steam to form more hydrogen and carbon monoxide, which it in turn is reacted with more steam to form carbon dioxide and yet more hydrogen.

In the preferred embodiment of the invention, the carbon dioxide is scrubbed from the process off-gas, leaving hydrogen gas substantially free of oxygen, carbon oxides, and hydrocarbons.

When the off-gas from the process is to be used as a raw material for ammonia synthesis, the oxygen is added in the form of air so that a stoichiometric amount of nitrogen (one volume of nitrogen for each three volumes of hydrogen which is finally present in the off-gas) is added to the reformer feed. Steam is also added to the reformer feed. All of the oxygen added with the air is reduced, thereby converting at least some of the carbon in the hydrocarbons to carbon monoxide and carbon dioxide. The burning of the hydrocarbons with the oxygen takes place in a secondary reformer and is beneficial in the following ways:

(1) The temperature of the gas mixture is raised to increase the reaction of hydrocarbons and steam to form carbon monoxide and hydrogen; and (2) The oxygen and hydrocarbons combine to form the carbon oxides, which can be removed easily, thus leaving the hydrogen and nitrogen as a gas mixture relatively free of other gases and available as a substantially pure and properly proportioned mixture for subsequent ammonia synthesis.

For a feed gas in which the hydrocarbons may be principally butane or heavier, it is desirable to add to the feed gas a sufficient amount of lighter hydrocarbon, such as methane, to ensure a concentration sufficient to consume the oxygen present in the added air to prevent unwanted consummation of hydrogen. The low molecular weight hydrocarbons should be present in an amount of about 5% by volume, or more, in order to obtain the above-mentioned benefits.

These and other aspects of the invention will be more completely understood from the following detailed description taken in conjunction with the accompanying drawing which shows in schematic flow diagram form the presently preferred embodiment of the invention as used in the preparation of feed for ammonia production.

Referring to the drawing, a feed gas of hydrogen and hydrocarbons is pumped by a gas compressor 1 through a line 2 into a compressor after-cooler 4. The compressed and cooled gas mixture then flows serially through an amine absorber 6, a caustic scrubber 8 and a desulfurizer 10, which remove acid gases such as carbon dioxide and hydrogen sulfide which may be present in the feed gas mixture. Each of these units may be of conventional type, for example the amine absorber uses a water solution of 18% diethanol amine which is fed from an amine solution stripper (not shown) into the top of the amine absorber through a line 12. A line 14 in the bottom of the amine absorber carries the spent amine solution to the amine stripper for regeneration. The caustic scrubber uses a water solution of 10% sodium hydroxide. Beds of activated charcoal are packed in the desulfurizer and reduce the hydrogen sulfide content of the feed gas to a negligible value.

After removal of the acid gases the feed gas flows through a heat exchanger 18 where it is cooled in a manner described below. The gas stream then flows into the center of a water separator 20, which is a vertical cylindrical tank that reduces the flow velocity of the gas to permit condensed water droplets to fall out. Water separated from the gas is removed from the water separator through a drain pipe 22.

The gas stream next passes out the top of the water separator through a line 24 and into the top of a gas drier 26 containing activated alumina which removes water vapor from the gas.

The gas then flows from the bottom of the gas dried through a pipe 28 and through a series of eight condensers 30, 31, 32, 33, 34, 35, 36 and 37, respectively, where the gas is cooled to cause condensation of the heavier hydrocarbons. From the last condenser 37 the gas stream flows through a pipe 38 into the center of a hydrocarbon separator 39 which is a vertical cylindrical tank that reduces the velocity of the gas to permit condensed hydrocarbon liquid droplets to fall out and be removed from the bottom of the hydrocarbon separator by means of a pipe 40.

A propane refrigeration unit 41 is used to supply cooling to condenser 31, and an ethylene refrigeration unit 42 supplies cooling to the condenser 37.

The condensed hydrocarbons from the hydrocarbon separator flow through pipe 40 serially and countercurrent to the incoming feed gas through condensers 35 and 33 where the cooled liquid removes some heat from the incoming gas and is partially vaporized. The liquid hydrocarbon then flows through a pipe 43 into the center of a by-product separator 44 which is a relatively vertical cylindrical vessel that reduces the flow velocity and pressure of the condensed hydrocarbons to permit further volatilization of the liquid hydrocarbons and settlement to the bottom of the by-product separator of the liquid hydrocarbons. The gas passes out the top of the by-product separator into a fuel line 45. The liquid hydrocarbons from the bottom of the by-product separator are forced by a pump 51 into a depropanizer 52 from which the lighter hydrocarbons are removed at the top as a gas through a line 53, and from which the heavier hydrocarbons ($C_4$'s and heavier hydrocarbons) are removed at the bottom as a by-product of the process. The gas from the top of the depropanizer is passed through an overhead condenser 54 and an accumulator 55 where further fractionation of the light hydrocarbons from heavier hydrocarbons is effected. The gas or light hydrocarbons from the accumulator pass into fuel line 45 to be combined with the gas coming from the by-product separator, this gas mixture being burned for fuel. Heat for reboil in the propanizer is supplied by reboil heat exchanger 56.

The gas from the hydrocarbon separator referred to as reformer feed flows through a pipe 57 serially and countercurrent to the gas coming into the hydrocarbon separator through condensers 36, 34, 32 and 30 to absorb heat and cool the incoming gas. The warmed reformer feed then flows through heat exchanger 18 to pick up more heat and further cool the feed gas coming from the desulfurizer 10. A pipe 58 from the heat exchanger 18 carries the warmed reformer feed into a preheater 59. Water in the form of steam is added to the gas in pipe 58 through a pipe 60 which joins pipe 58 just before the preheater. Oxygen in the form of air is forced by an air compressor 61 into the top of an air desulfurizer 62 filled with beds of activated charcoal to remove from the air any sulfur compounds which might be present. A pipe 63 carries the compressed desulfurized air into the preheater where both the reformer feed and air are heated to the required temperature. The reformer feed and air are then mixed in a common pipe 64 and passed into the top of a secondary reformer 65 in which all of the oxygen in the gas is reduced to convert at least a portion of the carbon in the hydrocarbons present to carbon monoxide and carbon dioxide. Any hydrocarbons in excess of the amount required to react with the oxygen react with the steam to form carbon monoxide and hydrogen. A suitable catalyst, such as nickel on an inert base, in the secondary reformer speeds this latter reaction.

The reaction-gas flows from the bottom of the secondary reformer through a pipe 66 into the top of a shift converter 68 in which carbon monoxide reacts with the steam to form carbon dioxide and additional hydrogen. The off-gas, which is now principally hydrogen and nitrogen with a minor proportion of carbon dioxide, is then carried from the bottom of the shift converter through a pipe 70 to an amine absorber 72 which is supplied amine solution from a stripper (not shown) through a pipe 74. A pipe 76 in the bottom of the amine absorber carries the spent amine solution to the amine stripper.

The gas coming out of the top of the amine absorber through a pipe 78 is a mixture of practically pure hydrogen and nitrogen, all of the hydrocarbons having been converted to hydrogen, and the carbon dioxide being removed in the amine absorber. The amount of nitrogen in the mixture is determined by the amount of air added to the preheater, and is proportioned so that the mixture coming from the amine absorber is 75% hydrogen and 25% nitrogen. If desired, further purification may be made of the mixture, such as scrubbing out remaining traces of carbon monoxide with conventional agents, before the gas is sent to an ammonia synthesis unit (not shown).

The operation of the process can be more fully appreciated by following an actual example through the plant shown in the drawing. A typical feed available as a catalytic reformer off-gas and which will serve as the feed gas of hydrogen and hydrocarbons for this process has the following composition by volume:

| | Percent |
|---|---|
| Hydrogen | 72.8 |
| Nitrogen | 1.2 |
| Methane | 11.8 |
| Ethane | 7.5 |
| Propane | 4.6 |
| Butane | 1.3 |
| Pentane | .4 |
| Hexane (and heavier) | .4 |

The above composition is on a dry basis and excludes any carbon dioxide which may be present. To produce about 300 tons of ammonia per day requires about 2220 mols/hr. of the above feed gas. This gas is available at a pressure of approximately 300 pounds per square inch and is further compressed to about 450 pounds per square inch, which increases its temperature to about 250° F., and is then passed through the compressor after-cooler, amine absorber, caustic scrubber and desulfurizer and heat exchanger 18. In passing through the heat exchanger 18, the feed gas is cooled from about 100° F. to about 55° F., causing some condensation of water. The condensed water is removed in the water separator and the water saturated gas is then dried on passing through the gas drier from which it emerges at a temperature of about 55° F. and a pressure of about 415 pounds per square inch. The dried gas then passes through the series of condensers, the propane refrigeration unit supplying refrigerant to condenser 31 at about —30° F., and the ethylene refrigeration unit supplying refrigerant to condenser 37 at about —150° F. Under this operation the gas stream enters the hydrocarbon separator at about —130° F. and a pressure of about 385 pounds per square inch. Some of the hydrocarbons, principally the heavier hydrocarbons, are now in liquid form and removed from the bottom of the hydrocarbon separator. The reformer feed leaving the hydrocarbon separator has the following composition by volume and on a dry basis:

| | Percent |
|---|---|
| Hydrogen | 83.8 |
| Nitrogen | 1.2 |
| Methane | 12.1 |
| Ethane | 2.5 |
| Propane | .2 |

The liquid hydrocarbon which flows as previously described through condensers 35, 33, the by-product separator, depropanizer, overhead condenser, and accumulator are separated so that the by-product recovery from the depropanizer has the following composition by volume:

| | Percent |
|---|---|
| Propane | 2.5 |
| Butane | 59.5 |
| Pentane | 19.0 |
| Hexane (and heavier) | 19.0 |

The combined gas stream from the by-product separator and accumulator has the following composition by volume:

| | Percent |
|---|---|
| Hydrogen | .5 |
| Methane | 11.6 |
| Ethane | 47.6 |
| Propane | 38.7 |
| Butane | 1.6 |

To make 300 tons per day of ammonia, 1790 mols/hr. of the reformer feed from the hydrocarbon separator is fed into the air and gas mixture preheater. Seventy thousand pounds per hour of steam at a temperature of 380° F. and pressure of about 185 pounds per square inch is added to the reformer feed before the preheater. To obtain a stoichiometric volume of nitrogen to combine with all of the hydrogen which will finally be present in the gas, 920 mols/hr. of air is passed through the preheater and added to the gas.

In the secondary reformer, operating at a temperature of 1500° F., a pressure of 150 pounds per square inch, and using a nickel catalyst on an inert base, for example of the type G-29 or G-31 sold by The Girdler Corporation, the hydrocarbons react with the steam and oxygen in the air to give a reaction product having the following reaction-gas composition by volume on a dry basis:

| | Percent |
|---|---|
| Hydrogen | 66.9 |
| Nitrogen | 22.9 |
| Carbon monoxide | 4.9 |
| Carbon dioxide | 4.9 |
| Methane | .4 |

The mols per hour of hydrogen coming out of the secondary reformer are 2190 compared to 1490 entering the secondary reformer, i. e. 700 mols per hour of hydrogen are generated in the secondary reformer.

The reaction-gas from the secondary reformer then passes through the shift converter which is operated at a temperature of 750° F., a pressure of 145 pounds per square inch and uses an iron oxide catalyst, e. g. of the type G-3 sold by The Girdler Corporation, in which substantially all of the carbon monoxide is reacted with steam to form carbon dioxide and additional hydrogen. The process off-gas coming from the shift converter has the following composition by volume on a dry basis:

| | Percent |
|---|---|
| Hydrogen | 67.7 |
| Nitrogen | 22.6 |
| Carbon monoxide | .4 |
| Carbon dioxide | 8.9 |
| Methane | .4 |

The off-gas coming from the shift converter may be used after removal of carbon oxides directly as synthesis gas. However, in the presently preferred ammonia synthesis process, some recycling of the ammonia gas is used to improve the yield of ammonia. Such an ammonia process has the disadvantage of concentrating inert gases such as methane in the recycle stream. Therefore it is preferable to remove from the gas mixture as much of the inerts as is economical.

In an alternate form of the invention the hydrocarbons are removed from the feed gas without the addition of nitrogen. This results in a substantially pure hydrogen gas which may be used for any required purpose. The oxygen in such process is added to the feed gas under treatment as pure oxygen rather than mixed with nitrogen as in the case of air. The remainder of the process is the same, the difference being that the resulting gas is virtually free of nitrogen.

I claim:
1. The process for removing hydrocarbons from a catalytic reformer off-gas containing a mixture of hydrogen and gaseous hydrocarbons without the use of a primary reformer, which process includes cooling the gas mixture to condense substantially all of the hydrocarbons having more than three carbon atoms and leave in the gas a major portion of the hydrocarbons containing less than three carbon atoms, separating the condensed hydrocarbons from the remaining gas mixture, adding steam to the gas mixture, adding oxygen to the gas mixture, reducing substantially all of the added oxygen in a secondary reformer type of reaction at a temperature substantially below the temperature of a primary reformer type of reaction, thereby converting carbon in the remaining gaseous hydrocarbons to carbon monoxide and carbon dioxide, subjecting the mixture to a shift conversion reaction to form additional hydrogen and carbon dioxide, and thereafter removing the carbon dioxide to leave a gas substantially free of oxygen, carbon oxides, and hydrocarbons.

2. The process for removing hydrocarbons from a catalytic reformer off-gas containing a mixture of hydrogen and gaseous hydrocarbons without the use of a primary reformer, which process includes cooling the gas mixture to condense substantially all of the hydrocarbons having more than three carbon atoms and leave in the gas a major portion of the hydrocarbons containing less than three carbon atoms, separating the condensed hydrocarbons from the remaining gas mixture, adding to the gas mixture a hydrocarbon having not more than three carbon atoms per molecule to maintain the hydrocarbon concentration greater than 5% by volume, adding steam to the gas mixture, adding oxygen to the gas mixture, reducing substantially all of the added oxygen in a secondary reformer type of reaction at a temperature substantially below the temperature of a primary reformer type of reaction, thereby converting carbon in the remaining gaseous hydrocarbons to carbon monoxide and carbon dioxide, subjecting the mixture to a shift conversion reaction to form additional hydrogen and carbon dioxide, and thereafter removing the carbon dioxide to leave a gas substantially free of oxygen, carbon oxides, and hydrocarbons.

3. The process for removing hydrocarbons from a catalytic reformer off-gas containing a mixture of hydrogen, methane and other gaseous hydrocarbons without the use of a primary reformer, which process includes cooling the gas mixture to condense substantially all of the hydrocarbons having more than three carbon atoms and leave in the gas substantially all the methane, separating the condensed hydrocarbons from the remaining gas mixture, adding steam to the mixture, adding oxygen to the gas mixture, reducing substantially all of the added oxygen in a secondary reformer type of reaction at a temperature substantially below the temperature of a primary reformer type of reaction, thereby converting carbon in the remaining gaseous hydrocarbons to carbon monoxide and carbon dioxide, subjecting the mixture to a shift conversion reaction to form additional hydrogen and carbon dioxide, and thereafter removing the carbon dioxide to leave a gas substantially free of oxygen, carbon oxides, and hydrocarbons.

4. The process for removing hydrocarbons from a catalytic reformer off-gas containing a mixture of hydrogen and gaseous hydrocarbons without the use of a primary reformer, which process includes cooling the gas mixture to condense substantially all of the hydrocarbons having more than three carbon atoms and leave in the gas a major portion of the hydrocarbons containing less than three carbon atoms, separating the condensed hydrocarbons from the remaining gas mixture, adding steam to the gas mixture, adding air to the gas mixture, reducing substantially all of the added oxygen in a secondary reformer type of reaction at a temperature substantially below the temperature of a primary reformer type of reaction, thereby converting carbon in the remaining gaseous hydrocarbons to carbon monoxide and carbon dioxide, subjecting the mixture to a shift conversion reaction to form additional hydrogen and carbon dioxide, and thereafter removing the carbon dioxide to leave a gas substantially free of oxygen, carbon oxides, and hydrocarbons, the air being added in an amount to achieve approximately a one to three ratio of nitrogen to hydrogen in the ammonia synthesis feed.

References Cited in the file of this patent

UNITED STATES PATENTS

| 1,875,920 | Gordon | Sept. 6, 1932 |
| 1,919,857 | Pier | July 25, 1933 |

FOREIGN PATENTS

| 231,218 | Great Britain | Mar. 26, 1925 |
| 471,068 | Canada | Jan. 23, 1951 |

OTHER REFERENCES

"Ammonia From Cat. Reformer Off-Gas," Carl Pfeiffer and Henry Sandler, Petroleum Refiner 34, No. 5, May, 1955, pp. 145–152.